Patented Dec. 29, 1925.

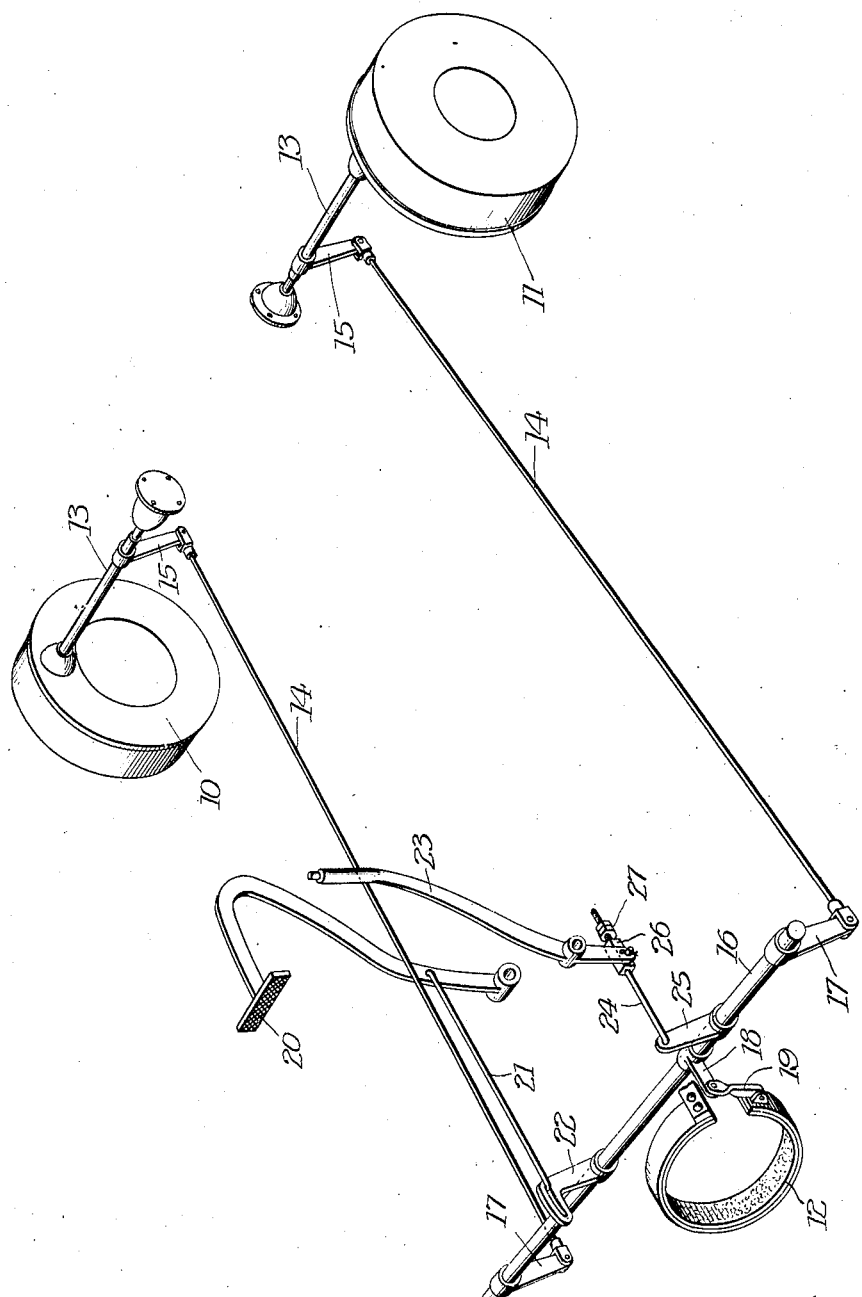

1,567,699

UNITED STATES PATENT OFFICE.

VINCENT BENDIX, OF CHICAGO, ILLINOIS, ASSIGNOR TO BENDIX BRAKE COMPANY, OF CHICAGO, ILLINOIS, A CORPORATION OF ILLINOIS.

BRAKING SYSTEM.

Application filed August 25, 1924. Serial No. 733,895.

*To all whom it may concern:*

Be it known that I, VINCENT BENDIX, a citizen of the United States, residing at Chicago, in the county of Cook and State of Illinois, have invented certain new and useful Improvements in a Braking System, of which the following is a specification.

The invention has for its object the provision of an improved and simplified braking system for four-wheel motor vehicles, which consists essentially in the combination of three centrally-controlled brakes operating on the two front wheels and the power transmission line for braking all four wheels.

More particularly, the invention contemplates a central control for applying the several brakes simultaneously, a plurality of means for operating the control member, arrangements whereby the several operating means may be manipulated separately and independently of each other, and the provision of specific mechanism which may be employed to advantage in utilizing the several features of the invention.

In the accompanying drawings and in the following detailed description based thereon, I have shown what I consider to be the most desirable construction and arrangement of parts for carrying out the purposes of the invention. Obviously, however, other and varied means, arrangements and modes of operation may be employed within the spirit, scope and contemplation of the invention, wherefore the drawings and description are to be considered merely as illustrative and not in any unnecessarily limiting sense, and the claims are to be construed with this reservation in mind.

The drawings comprise a perspective view of the braking system, which is designated Fig. 1.

It will be observed that the braking system includes two front wheel brakes 10 and 11 and a transmission brake 12. The brakes may be of any desired type. The two wheel brakes 10 and 11 are provided with universally mounted control rods 13 which are oscillated by rods 14 connected to torque arms 15 on the rods 13. The rods 14 are in turn connected with a cross rockshaft 16 by torque arms 17 on the shaft. It will be understood that when the shaft 16 is oscillated, the brakes 10 and 11 will be applied through the connections described. The transmission brake 12 is also operated from the crossshaft 16 by means of a torque arm 18 which is connected with an operative portion 19 of the brake.

A service pedal 20 operates the three brakes 10, 11 and 12 through a rod 21 which engages a slot in, and is slidably connected with, a torque arm 22 on the shaft 16. An emergency lever 23 also operates the three brakes 10, 11 and 12 through a rod 24 which connects with a torque arm 25 on the shaft 16. The rod 24 is secured against longitudinal movement with respect to the arm 25, but is slidable in the block 26, carried by the lever. The adjusting nut 27, on the free threaded end of the rod 24, provides an abutment against which the block engages, and serves to transmit the operative movement of the emergency lever to the rod and thus to the rockshaft 16.

The slidable mounting of the operating rods 21 and 24, in the manner indicated, provides an overrunning relation between the two brake operating means, that is to say, it permits manipulation of the service pedal to set the brakes, without disturbing the emergency lever, and conversely, manipulation of the emergency lever without affecting the normal position of the service pedal.

Where reference is made herein to a transmission brake it is to be understood as including any means applied to, and at any point along, the power transmission line for retarding the movement of the vehicle.

I claim:

1. A braking system for four-wheel motor vehicles, consisting of a brake on each front wheel, a brake on the transmission, a control for applying the brakes simultaneously, a service pedal connected to said control, an emergency lever connected to said control, and means permitting the manipulation of the pedal and lever independently of each other.

2. A braking system for four-wheel motor vehicles, consisting of a brake on each front wheel, a brake on the transmission, a control, connections between said control and the brakes, a service pedal, and an emergency lever, the said pedal and lever being yieldingly connected to said control to permit application of the brakes through either without affecting the other.

3. A braking system for four-wheel motor vehicles, consisting of a brake on each front wheel, a brake on the transmission, a control, connections between said control and the brakes, a service pedal, and an emergency lever, the said pedal and lever being connected to operate upon, but not to be operated by, said control.

4. A braking system for four-wheel motor vehicles, consisting of a brake on each front wheel, a brake on the transmission, a rockshaft, connections between the brakes and the rockshaft, a service pedal and an emergency lever both connected to the rockshaft for rocking the same.

5. A braking system for four-wheel motor vehicles, consisting of a brake on each front wheel, a brake on the transmission, a rockshaft, connections between the brakes and the rockshaft, a service pedal and an emergency lever both connected to the rockshaft for rocking the same, the last-mentioned connections being mounted in overrunning relation to permit manipulation of each without affecting the other.

6. A braking system for four-wheel motor vehicles, consisting of a brake on each front wheel, a brake on the transmission, a control, connections between said control and the brakes, and foot and hand levers operable separately and independently through said control to apply the brakes.

In testimony whereof I have hereunto signed my name.

VINCENT BENDIX.